(12) United States Patent  
Zamuner

(10) Patent No.: US 7,342,199 B2  
(45) Date of Patent: Mar. 11, 2008

(54) ERGONOMIC HANDLE ATTACHMENT FOR WELDING TORCH

(75) Inventor: Frank Zamuner, Oakville (CA)

(73) Assignee: Lincoln Global, Inc., City of Industry, CA (US)

( * ) Notice: Subject to any disclaimer, the term of this patent is extended or adjusted under 35 U.S.C. 154(b) by 302 days.

(21) Appl. No.: 11/102,913

(22) Filed: Apr. 8, 2005

(65) Prior Publication Data

US 2006/0226135 A1   Oct. 12, 2006

(51) Int. Cl.
*B23K 9/00* (2006.01)
(52) U.S. Cl. ............................ 219/137.31; 219/144
(58) Field of Classification Search ........... 219/137.31, 219/144; 16/430; 81/489
See application file for complete search history.

(56) References Cited

U.S. PATENT DOCUMENTS

| 3,980,860 | A |  | 9/1976 | Howell et al. |
| 5,079,404 | A |  | 1/1992 | Zamuner |
| 5,195,164 | A | * | 3/1993 | Lambert ..................... 392/385 |
| 5,313,046 | A |  | 5/1994 | Zamuner |
| 6,610,963 | B2 | * | 8/2003 | Zamuner ............... 219/137.31 |
| 2004/0031781 | A1 |  | 2/2004 | Zamuner |
| 2007/0068912 | A1 | * | 3/2007 | Zamuner ............... 219/137.31 |

FOREIGN PATENT DOCUMENTS

| CA | 2053131 | 4/1992 |
| CA | 2106837 | 3/1994 |
| CA | 2139152 | 7/1995 |
| CA | 2338949 | 8/2004 |
| EP | 0 590 728 A1 | 6/1994 |
| GB | 2 214 598 A | 6/1989 |
| GB | 2 285 404 A | 12/1995 |

* cited by examiner

*Primary Examiner*—Kevin P. Kerns
(74) *Attorney, Agent, or Firm*—Fay Sharpe LLP

(57) ABSTRACT

An ergonomic handle attachment to be used with a welding torch handle, the attachment has an attachment portion having a first wall that is selectively attached to a wall of the handle and a second wall which extends from the first wall and is selectively received by an opening in the wall of the handle. A locking member is slidably received within the opening of the second wall and the wall of the handle when the opening of the second wall and the opening of handle are substantially aligned with each other.

20 Claims, 4 Drawing Sheets

ERGONOMIC HANDLE ATTACHMENT FOR WELDING TORCH

INCORPORATION BY REFERENCE

This application relates to welding torches having handles intended to be held manually during use, such as disclosed in U.S. Pat. No. 6,610,963 which is hereby totally incorporated by reference herein, and Published Application No. US 2004/0031781 which is also hereby totally incorporated by reference herein.

BACKGROUND

The present exemplary embodiment relates to welding torches of the kind that are used by welders in industry, where the torch is intended to be held in the hand of the welder for hours at a stretch. It is all too often the case that the welder develops painful symptoms, or at least fatigue, in the hand and wrist, from holding the torch. It is not so much that the torch is heavy in itself, but the problem is that the torch has a hose or pipe connecting it to the welding service center, and the hose can impose a constant drag on the torch, making the torch cumbersome and difficult to manipulate.

It is part of the welding torch operator's task to hold the torch, in his hand, perhaps for hours. The service hose of the torch contains the electricity supply, the consumable welding wire, the inert-gas supply, the cooling water circulation conduits, and perhaps a vacuum suction hose for extracting the fumes, which, even to the habitual expert welder, can make the torch seem extremely heavy after a while.

One of the problems is that the welder must grip the torch handle in his hand, and must grip it quite tightly, in order to manipulate the torch and hose, and to hold the torch in position. Plus, it is in the nature of welding that the grip must be maintained at all times: the torch cannot be held steady, by resting the torch against something. It is also recognized that much of the fatigue of the hands experienced by welders arises rather from the need to maintain a tight gripping hold on the torch, using the fingers of the torch hand, in order to maintain the correct orientation of the torch, than from actually moving and positioning the torch, using the wrist.

Previous attempts to make it easier to grip the torch handle have been in the areas of making the handle curved to better fit the natural shape of the hand, or of having recessed finger grips moulded into the (plastic) handle. However, many of these attempts do not make the handle adjustable for various sizes and shapes of hands.

Thus, it is desirable to provide an ergonomic handle attachment which is adjustable to accommodate various shapes and sizes of hands and various gripping positions of hands.

SUMMARY OF THE INVENTION

The present invention is directed to handle attachments for welding torches, in particular an over-handle to be used with a welding torch handle. That is, the present invention is aimed at taking away the need for the welder to grip the torch handle. The invention provides an over-handle attachment, which enables the welder to slide the first web area of his hand, i.e. the web area between the thumb and forefinger, into the space between the torch handle and the over-handle, and the over-handle is so designed that this space receives the first web area, and (slightly) squeezes the first web area. In the conventional torch handle, the welder's hand and the torch could only be integrated into a manipulative whole unit when the welder gripped the handle tightly; with the handle attachment of the invention, the welder's hand and the torch can form an integrated manipulative unit without the need for the welder to grip the torch handle.

Of course, many different types of articles are adapted to be held in the hand, and to be manipulated by a person. Handles and grips have been designed for all kinds of specialized functions. The present invention is aimed specifically at making it possible for a welder to complete a long period of work without hand-fatigue, recognizing that the major cause of hand fatigue in welders has been the constant drag of the hose that connects the torch to the service center. The welder not only has to support the weight of the torch, but the presence of the hose means that the welder also has to exert a forceful grip on the torch, to maintain the torch in its correct orientation, against the constant drag or pull of the hose, and it is this latter requirement that is mainly responsible for the fatigue.

It might be considered that one way in which the welder's hand might be attached to the torch, without the need for the welder to grip the torch, would be for the torch to be strapped to the welder's hand. However, this would not be advisable. The welder must be able to set the torch down, and withdraw his hand, with a minimum of impediment from the torch itself. The handle attachment as described herein is aimed at creating a firm, secure, unity of the welder's hand with the torch, and yet is aimed at making it possible for the welder to easily release the torch immediately from his hand, should the occasion arise. Furthermore, the handle attachment is adjustable to accommodate various sizes and shapes of hands by having a slidable locking arrangement which allows the over-handle to move in a longitudinal direction with respect to the torch handle.

Thus, according to one aspect of the invention, an ergonomic handle attachment is used with a welding torch handle having an attachment portion with a first wall that is selectively attached to a wall of the handle; and a second wall which extends from the first wall and is selectively received by an opening in the wall of the handle. The second wall has at least one opening therethrough. The wall of the handle also has an opening therethrough. A locking member is slidably received within the opening of the second wall and the wall of the handle, when the opening of the second wall and the opening of the locking member handle are aligned with each other.

In accordance with another aspect of the invention, an ergonomic over-handle attachment, in combination with a welding torch handle, includes an attachment member attached to the torch handle at a front portion of the torch handle. A hand-grip member extends rearwardly from the attachment member. The hand grip member has cheeks at opposite ends thereof, which are so arranged to provide a comfortable constraint for a hand of a user. A locking arrangement is provided for the attachment member, including a slidable pin which engages an opening in the welding torch handle and the attachment member and prevents the attachment member from sliding with respect to the welding torch handle.

In accordance with yet another aspect of the invention, a method of adjusting an over-handle for a handle for a welding torch, includes attaching an attachment member to the handle at a front portion of the handle, wherein the attachment portion has a first wall, a second wall and a third wall. The second wall of the attachment is inserted into a first opening of the handle. The third wall of the attachment is inserted into a second opening of the handle. The opening in the second wall of the attachment is aligned with a third opening of the handle. A locking member is inserted through the opening in the second wall of the attachment and through the third opening of the handle to lock the attachment in a position with respect to the handle.

Still other aspects of the invention will become apparent from the following description taken together with the accompanying drawings.

BRIEF DESCRIPTION OF THE DRAWINGS

By way of further explanation of the invention, exemplary embodiments of the invention will now be described with reference to the accompanying drawings, in which.

DETAILED DESCRIPTION

The apparatuses shown in the accompanying drawings and described below are examples which embody the invention. It should be noted that the scope of the invention is defined by the accompanying claims, and not necessarily by specific features of exemplary embodiments.

Figure 1:
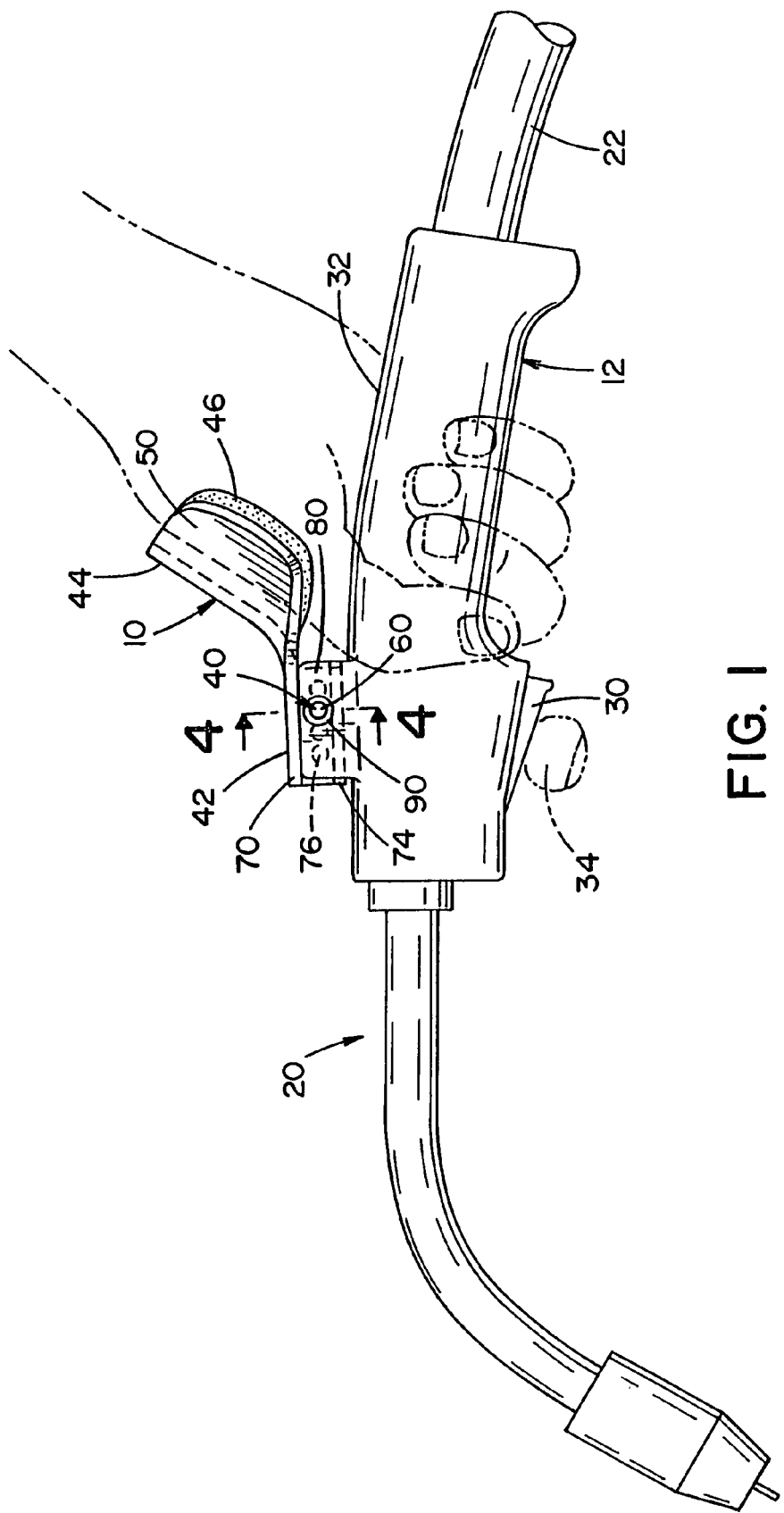
FIG. 1 is a side elevation of a welding torch with a handle-attachment in accordance with a preferred embodiment of the present invention.

FIG. 1 shows an ergonomic handle attachment 10, attached to a handle 12 of a MIG welding torch 20 in accordance with a preferred embodiment of the present invention. A service hose 22 connects the torch to the service center (not shown) that houses the electrical supply, gas supply, welding rod feed mechanism, cooling water supply and return, fume suction, etc. These items are activated by trigger 30 of the torch.

The handle 12 of the torch 20 is conventional, in itself. Conventional welding torch handles are to some extent ergonomically shaped. The top surface of the handle can be curved, as shown at 32, to fit the hollow of the palm of the hand. The handle is designed so that a forefinger 34 falls naturally onto the trigger. The handle can accommodate both left-handed and right-handed welders.

As shown in FIG. 1, an ergonomic handle attachment, or over-handle 10 is attached onto the front end of the handle 12. The over-handle 10 overlies the area of the welder's hand between the thumb and the forefinger. This area of the hand is known as the first web area. In this area, the first dorsal inteross muscle runs from the base of the thumb to the forefinger, while the adductor pollicis muscle pulls the other way, i.e. from the base of the forefinger onto the thumb.

When the over-handle 10 is present, the welder holds the handle 12 of the torch in the normal way, i.e., with the palm of the hand lying along the top of the handle, the thumb to one side, and the fingers underneath. The over-handle allows the first web area to be engaged between the over-handle and the handle. (FIG. 1 shows the welder's bare hand, for clarity: of course, welders normally wear thick protective gauntlets, gloves or the like.)

It is recognized that the above-mentioned muscles in the first web area are substantially not inhibited in their normal functioning, even over a period of several hours at a time, by the presence of the over-handle 10. The over-handle can be so shaped and positioned that the welder can manipulate and manhandle the torch 20, with the hose 22 attached, without exerting any muscular squeeze or grip on the torch handle 12. That is to say, the fingers and thumb of the torch hand can be actually held clear of the torch, and yet still the first web area of the hand is sufficiently securely held to the torch as to permit the required precision and security of movement control of the torch as is needed in the welding operation. As a result, the welder can more or less completely relax his encircling grip on the torch.

It should be noted, however, that the present invention is aimed at reducing the need for the welder to grip the handle, not at eliminating that need completely. Of course, the welder still needs to have his fingers present in an encircling configuration on the torch handle, to operate the trigger 30. The over-handle reduces the need to squeeze-grip the torch handle with one's fingers.

The over-handle can be attached as an accessory to an existing torch handle. The over-handle may be simply clamped around the handle. Or, as shown in FIG. 1, the over-handle may be secured to the torch handle via locking members or pins 40.

Extending from the fixing or attachment area 42 of the over-handle is a hand-grip area 44. This area is curved slightly, to follow the general shape of the first web area of the hand. The (concave) inside-facing surface of the hand-grip area can have a foam-rubber cushion 46, for extra comfort, and for a little extra grip, but the cushion is not required.

Figure 2:
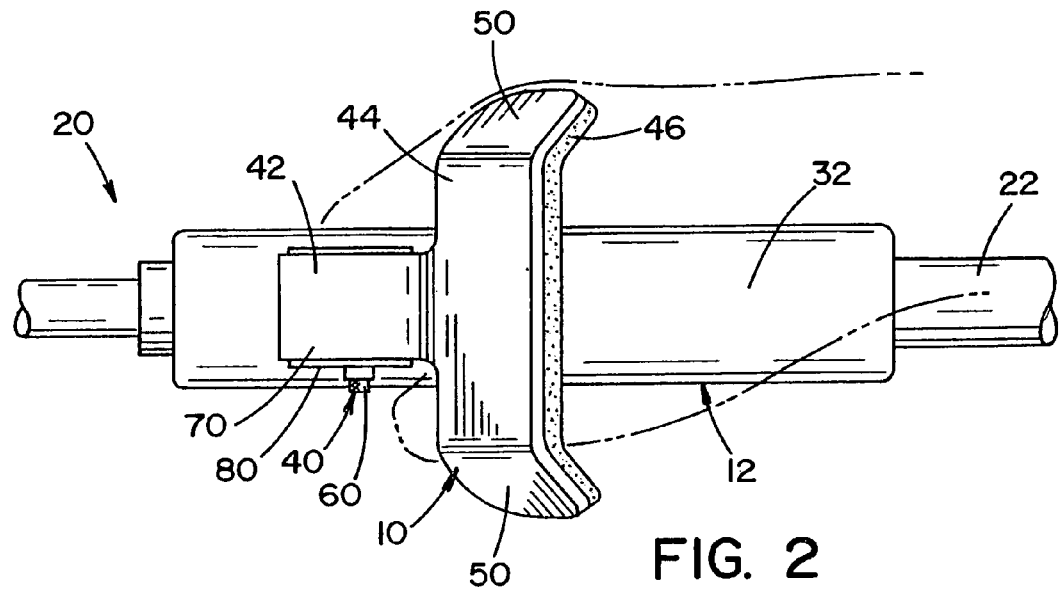
FIG. 2 is a top plan view of the welding torch of FIG. 1.
Figure 3:
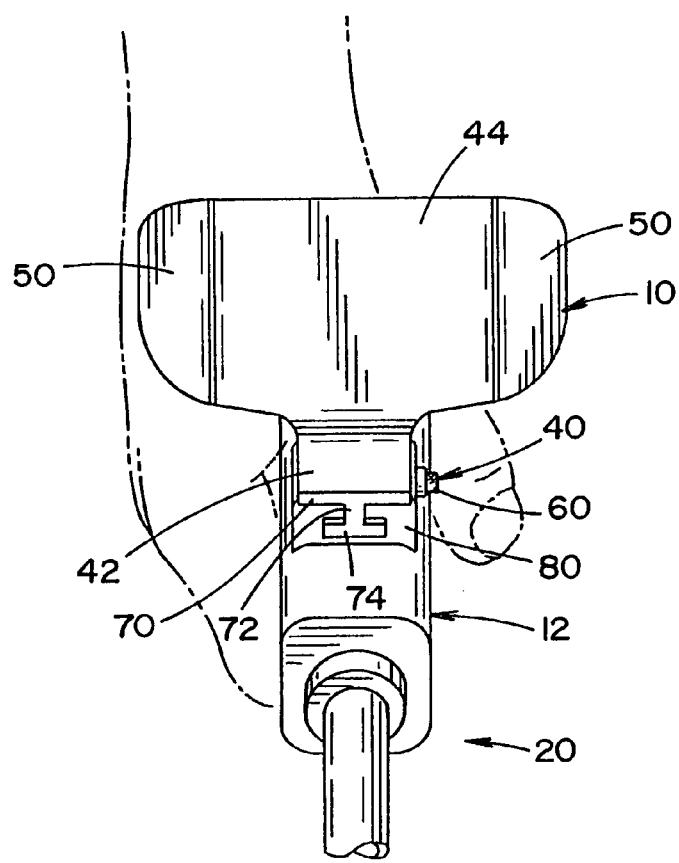
FIG. 3 is a front elevational view of the welding torch of FIG. 1.

Referring now to FIGS. 2 and 3, side cheeks 50 are provided on opposite sides of the hand-grip area, which curve downwards rather more steeply than the gentle curvature of the central portion of the hand-grip area. The cheeks 50 can be about 2.5 inches or so apart. The cheeks 50 serve to encase the welder's hand laterally to some extent. This lateral restraint is useful, in that it adds to the main restraint function of the over-handle, i.e. of squeezing the first web area between the over-handle and the top surface of the torch handle.

The term squeezing is used to mean that the first web area of the welder's hand is subjected to a slight compression. It is recognized, in the invention, that the first web area is able to be squeezed, in this sense, with enough force to make a large contribution to elimination of the need to grip the torch handle, but at the same time the squeeze force is small enough to cause substantially no discomfort, and virtually no interference with the normal movements of the hand. The squeezing of the first web area between the over-handle and the torch handle is almost imperceptibly gentle when compared with the extent to which a welder would have to grip the torch handle if the over-handle was not present.

The torch, with the over-handle attached, creates a squeeze grip for the first web area of the welder's hand which is considerably strong, mainly because the squeeze-grip is applied as a uniform light pressure over what amounts to quite a large area of the hand. Unless the over-handle is mis-sized for the particular welder's hand, the squeeze-grip is secure enough that the welder can even hold the torch vertically, i.e. tip down, and still not need to exert any encircling grip on the handle with his muscles.

It is preferable to make the over-handle adjustable in a longitudinal direction so that the welder can grip the handle in various positions along the handle and various sizes and shapes of hands can be accommodated. Adjusting the over-handle ensures a secure squeeze-grip without causing a substantial amount of discomfort to the user. FIGS. 3-6 illustrate the preferred invention in which adjustability can be provided for the over-handle.

Figure 4:
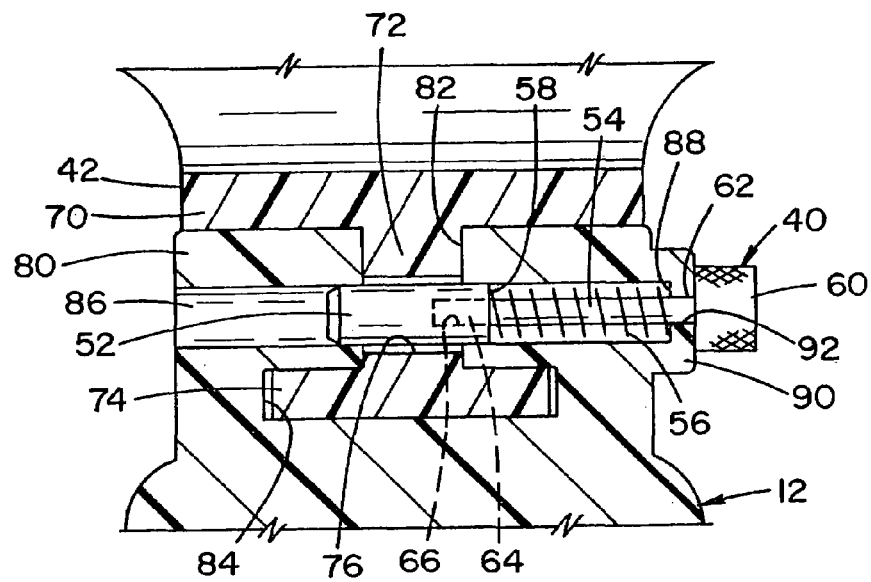
FIG. 4 is a cross-sectional view along lines 4-4 of FIG. 1.
Figure 5:
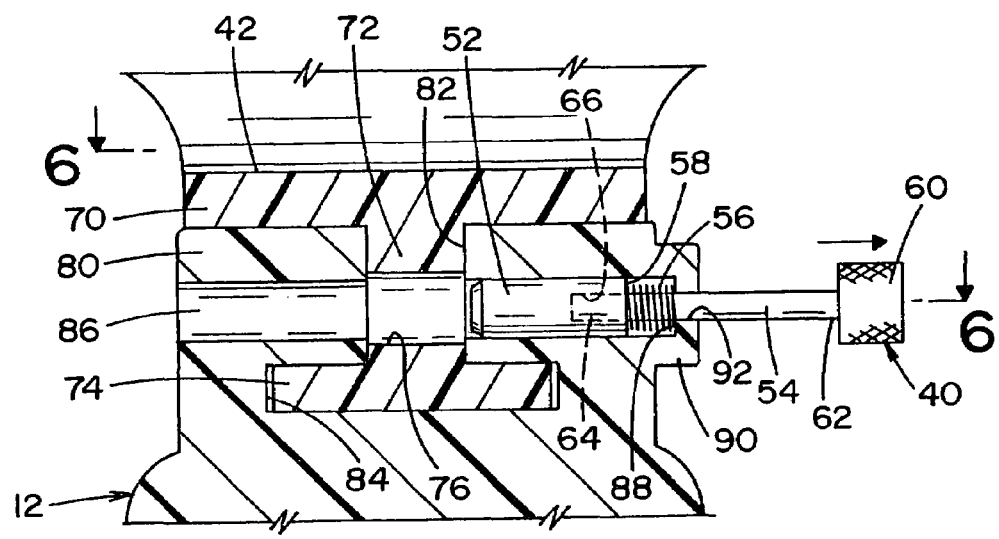
FIG. 5 is a cross-sectional view along lines 4-4 with a pin in a retracted position; and, FIG. 6 is a cross-sectional view along lines 6-6 of FIG. 5.

Referring now to FIGS. 4 and 5, the over-handle has attachment area 42 which includes an upper plate 70 from which the hand-grip area 44 extends. An intermediate wall 72 extends from the plate 70 and is substantially perpendicular to plate 70. A second plate 74 extends from wall 72 and is substantially perpendicular to wall 72 and substantially parallel to plate 70. Wall 72 and plate 74 form a substantially T-shaped conformation. Plates 70 and 74 are shown to each have the same thickness; however, various thicknesses of plates can be use without departing from the scope of the invention. Referring to FIG. 2, plate 70 is shown to have a rectangular shape; however, other shapes of plates are contemplated to be within the scope of the invention.

Figure 6:
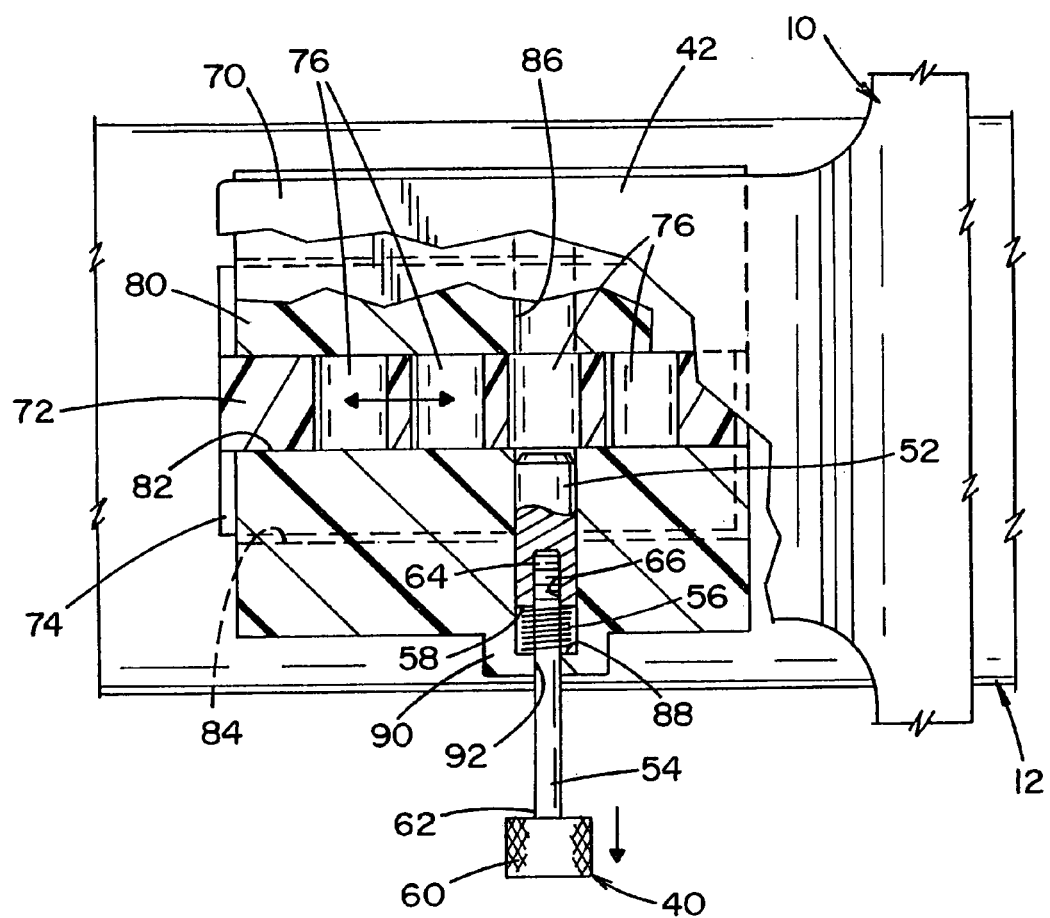

As seen in FIG. 6, wall 72 has a plurality of openings or apertures 76 for selectively receiving a first portion 52 of pin 40. These apertures extend completely through the wall 72 and can be equally or unequally spaced apart. The apertures can be circular or another shape to accommodate various shapes of pins 40.

Plate 70 is positioned above and is seated on a top surface of an attachment portion 80 which extends from the handle 12. Referring to FIG. 6, wall 72 is slidably received in an opening 82 in portion 80 which extends along a longitudinal axis of portion 80. Referring to FIG. 4, plate 74 is slidably received in opening 84 which extends from opening 82 and also extends along the longitudinal axis of the portion 80.

Referring to FIGS. 4-6, to enable the over-handle to be adjustable along a longitudinal direction, a locking assembly in the form of a spring biased pin arrangement is used. As seen in FIG. 4, locking member assembly 40 includes a pin with a first portion 52 and a second portion 54, where the first portion has a larger diameter than the second portion. A compression spring 56 is interposed between an end 58 of the first portion and a third portion 60 which is secured on an end 62 of the second portion. The third portion can be a handle which is knurled to facilitate gripping and pulling of the pin out of the over-handle attachment. The third portion has a diameter larger than a diameter of openings 86 and 76. The second portion can be installed onto the first portion by inserting an end 64 of the second portion into a bore 66 in a wall of the first portion. The bore can be threaded or any other arrangement can be used to secure the first portion and second portion together. Similarly, the third portion can be secured to the second portion by inserting end 62 of the second portion into a bore in a wall of third portion 60. The bore can be threaded or any other suitable arrangement can be used to secure the second portion and third portion together.

Referring to FIG. 4, attachment portion 80 further has an opening 86 which extends laterally across portion 80 and selectively receives first portion 52 and second portion 54 of pin 40. The diameter of opening 76 is shown to be slightly greater than the diameter of opening 86 to account for slight misalignment between the openings. The opening 86 has a shoulder or edge 88 formed at end 90 which also has a smaller opening 92 which selectively receives second portion 54 of the pin assembly. Spring 56 is captured between end 58 of the first portion and edge 88 of the attachment portion 80. The spring biases the first pin portion 52 in an extended position in opening 86 of portion 80 and opening 76 of plate 72.

Thus, to adjust the over-handle attachment in a longitudinal direction, pin handle 60 is pulled so that the pin slides through opening 86 and opening 76 and out of engagement with opening 76 of the over-handle. Spring 56 is compressed in this configuration as seen in FIG. 5. Then, the over-handle is slid in a longitudinal direction so that the opening 76 in plate 72 is out of alignment with opening 86 of portion 80, and the pin portion 52, until another opening 76 in the handle is aligned with both the opening 86 and the pin. The pin handle 60 is released, thus allowing the spring to extend and the first portion 52 to extend through opening 76 and into opening 86, as seen in FIG. 4. This locks the over-handle into a particular position with respect to the torch handle.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An ergonomic handle attachment to be used with a welding torch handle, said attachment comprising:
an attachment portion having a first wall that is selectively attached to a wall of said handle;
a second wall which extends from said first wall and is selectively received by a first opening in said wall of said handle;
said second wall comprising at least one opening therethrough;
said wall of said handle comprising a second opening therethrough; and a locking member which is slidably received within said opening of said second wall and said second opening of said wall of said handle when said opening of said second wall and said second opening of said wall of said handle are substantially aligned with each other, wherein said locking member comprises a first portion, a second portion, and a third portion, wherein said second portion extends between said first and third portions, and a spring which is interposed between said first and third portions and surrounds said second portion.

2. The handle attachment of claim 1, wherein said first portion of said locking member has a larger diameter than said second portion of said locking member.

3. The handle attachment of claim 1, wherein said spring biases said locking member in an extended position engaging said opening of said second wall and said second opening of said wall of said handle.

4. The handle attachment of claim 1, wherein said attachment portion further comprises a third wall which extends from said second wall.

5. The handle attachment of claim 4, wherein said third wall is oriented substantially perpendicular to said second wall.

6. The handle attachment of claim 1, wherein said second wall is oriented substantially perpendicular to said first wall.

7. The handle attachment of claim 4, wherein said third wall is oriented approximately parallel to said first wall.

8. The handle attachment of claim 1, wherein said locking member third portion comprises a handle.

9. The handle attachment of claim 1, further comprising a hand-grip portion which extends rearwardly from the attachment portion.

10. The handle attachment of claim 9, wherein said hand-grip portion comprises a planar surface and a pair of walls extending at an angle from said planar surface.

11. The handle attachment of claim 10, wherein said pair of walls comprise cheeks.

12. The handle attachment of claim 1, wherein said second wall comprises a plurality of openings which selectively receive said locking member.

13. The handle attachment of claim 1, wherein said spring is compressed when said locking member is retracted from engagement with said opening of said second wall and said opening of said wall of said handle.

14. The handle attachment of claim 9, wherein said hand-grip portion is oriented in a position spaced apart from said wall of said handle.

15. The handle attachment of claim 14, wherein said hand-grip portion and said handle form a space therebetween sized and shaped to selectively receive a web area of a hand of a person between the person's thumb and forefinger.

16. The handle attachment of claim 15, wherein said over-handle is configured so that said attachment portion is positioned in front of said web area of said hand of said person.

17. The handle attachment of claim 15, wherein the space created by the handle and the hand-grip portion is configured such that when the web area of the hand is gripped between the handle and the hand-grip portion, the person is able to manipulate and use the torch.

18. The handle attachment of claim 15, wherein the configuration of the over-handle is such that when said web area of said hand is located in said space, said attachment portion lies between a thumb and a forefinger of said hand.

19. The handle attachment of claim 8, wherein said locking member third portion comprises a knurled handle.

20. The handle attachment of claim 9, wherein said hand-grip portion further comprises a cushion for providing padding to the hand-grip portion.

\* \* \* \* \*